INVENTORS.
Raul E. Casas
Juan L. Rayces

BY Irving M. Kriegsman
ATTORNEY.

United States Patent Office 3,515,461
Patented June 2, 1970

---

3,515,461
CATADIOPTRIC OBJECTIVE OF THE CASSEGRAIN TYPE
Raul E. Casas, Danbury, Conn., and Juan L. Rayces, Santa Ana, Calif., assignors to The Perkin-Elmer Corporation, Norwalk, Conn., a corporation of New York
Filed Jan. 30, 1967, Ser. No. 612,433
Int. Cl. G02b 17/08
U.S. Cl. 350—199
4 Claims

ABSTRACT OF THE DISCLOSURE

An optical system for forming an image in which light from a primary mirror is reflected by a secondary mirror back through a hole in the center of the primary mirror. Two lens type correctors are positioned in the system to eliminate image defects.

BACKGROUND OF THE INVENTION

This invention relates to a catadioptric system. More particularly this invention relates to a catadioptric system of the Cassegrain type which may be used as a photographic objective.

The classical Cassegrainian telescope, as is well known in the art, consists basically of a concave parabolic shaped primary mirror having a centrally located aperture and a convex hyperbolic shaped secondary mirror. By using only aspherically shaped reflective elements the telescope is free from spherical and chromatic aberrations and provides the ultimate in on-axis imagery. Unfortunately, however, its performance deteriorates so rapidly as one goes off axis that it is rarely used when high resolution over an extended field is required. Furthermore, aspheric shaped surfaces are extremely difficult to fabricate.

Accordingly, modified versions of the Cassegrain telescope in which spherically shaped mirror surfaces are substituted for the aspheric shaped mirror surfaces have been repeatedly proposed for use as photographic objectives. To eliminate the image defects introduced by the use of spherically shaped surfaces, it has been suggested to place a pair of meniscus elements having powers approximately equal but of opposite signs and having their concave surfaces facing each other on the object side of (in front of) the secondary mirror. The front meniscus element is made positive in power and the rear meniscus element is made negative in power. An example of this catadioptric system may be found in U.S. Pat. No. 2,726,574.

SUMMARY OF THE INVENTION

It is an object of this invention to provide a new and improved Cassegrainian type catadioptric system.

It is another object of this invention to provide a new and improved catadioptric system which may be used as a photographic objective.

It is still another object of this invention to provide a new and improved Cassegrainian type catadioptric system that is compact, does not contain any aspheric surfaces and has the characteristics of a telephoto objective.

It is yet still another object of this invention to provide a new and improved Cassegrain type photographic objective which has a speed of about $f/8$, has a relatively long focal length, is apochromatic, is corrected for spherochromatism, covers a large spectral range and gives a high quality image over a total field of view of approximately $2°$.

It is another object of this invention to provide a catadioptric system which is inexpensive to manufacture and in which the refractive elements have the same index of refraction and Abbe number.

The above and other objects along with other attendant advantages are achieved by means of a catadioptric system constructed in accordance with this invention.

Basically, the system is made up of a spherically shaped concave primary mirror, a spherically shaped convex secondary mirror and a pair of corrector components for eliminating the image defects caused by the spherically shaped mirrors. Light collected by the primary mirror is reflected by the secondary mirror back through a hole in the center of the primary mirror. Each corrector component is made up of two lens elements. The rear element of the main (or front) corrector component is provided with a centrally located aperture and the secondary mirror is located in front of the back surface of the rear lens element of the main corrector component. By having the rear surface of the front lens element convex and the same radius as the secondary mirror, the secondary mirror may be formed directly on said rear surface. The auxiliary corrector component is located in the vicinity of the primary mirror.

Both corrector components are afocal systems, do not contain aspheric surfaces, and can be made up of materials having the same index of refraction and Abbe number.

The main corrector component compensates for the spherical aberration, and coma of the primary and secondary mirrors, introducing at the same time the proper amount of lateral color to compensate for the lateral color introduced by the auxiliary corrector. The auxiliary corrector is designed with overcorrected astigmatism and field curvature to compensate for the undercorrection introduced by the primary and secondary mirrors.

A clearer concept of the scope and purpose of the invention along with other advantages and features thereof will be obtained from the following detailed description taken in conjunction with the drawings.

DETAILED DESCRIPTION

Figure 1:
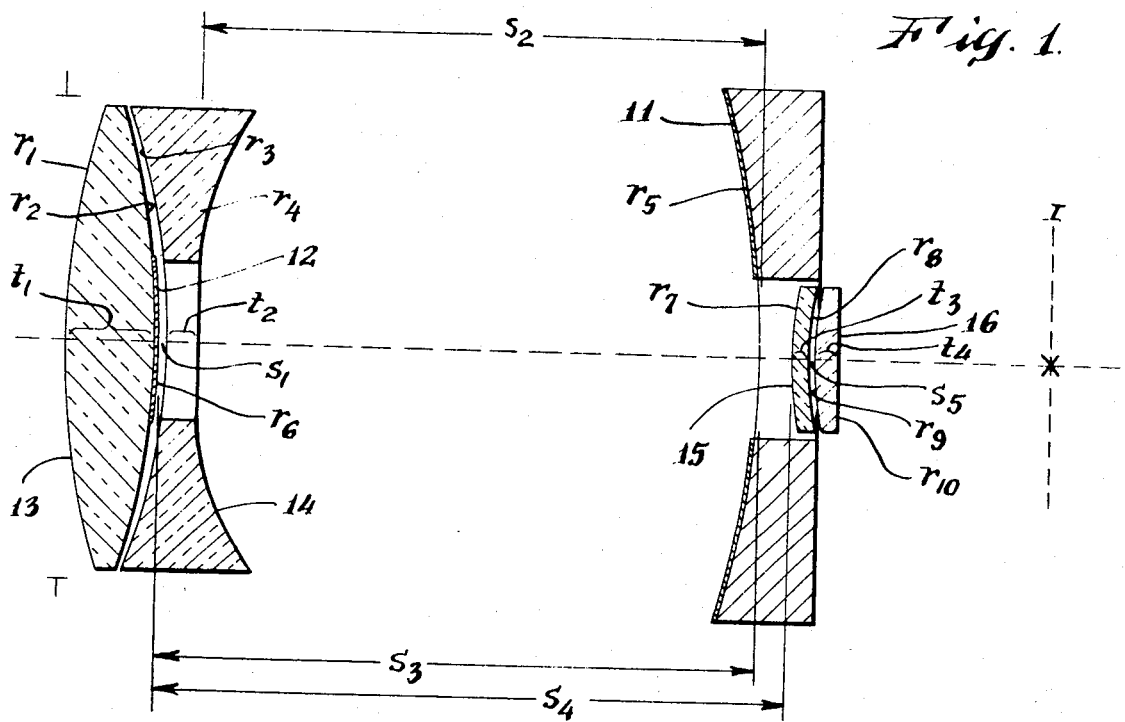
FIG. 1 is an optical diagram of one embodiment.

Referring now to FIG. 1, there is shown a system which includes a primary mirror 11, a secondary mirror 12, a main or front corrector component made up of lenses 13 and 14 and an auxiliary corrector component made up of lenses 15 and 16.

The primary mirror 11 is concave, is provided with a centrally located aperture and faces of the object.

Lens 13 which is the front lens element of the main correct component is positive in power and has its rear surface, that is, the surface facing the primary mirror 11, convex in shape.

Lens 14 which is disposed to the rear of lens 13 is negative in power and provided with a centrally located aperture. The numerical value of the power of the front lens 13 is approximately equal to the numerical value of the power of the rear lens 14. Lenses 14 and 15 are positioned as close as possible to each other.

The secondary mirror 12 which is convex is formed directly on the rear surface of the front lens element 13. Secondary mirror 12 may be a coating of reflective material such as for example aluminum.

The auxiliary lenses 15 and 16 are located in the vicinity of the primary mirror 11. Lenses 15 and 16 are of opposite power. The power of lens 15 is approximately equal numerically to the power of lens 16.

In the following chart there is listed a table of values for one example of a system constructed according to this embodiment. As is well known in the art, a plus sign is used to denote that a surface is convex to the object and that a distance is measured from left to right whereas a minus sign is used to denote that a surface is concave to the object and that a distance is measured from right to left.

CHART I

| Element | Radius | Spacings and Thickness |
|---|---|---|
| 13 | $r_1 = 605.59$ | |
|  | $r_2 = -1,146.29$ | $t_1 = 25.90$ |
|  |  | $s_1 = 1.00$ |
| 14 | $r_3 = -1,018.75$ | |
|  | $r_4 = 634.29$ | $t_2 = 11.50$ |
|  |  | $s_2 = 424.27$ |
| 11 | $r_5 = -1,433.83$ | |
| 12 | $r_6 = -1,146.29$ | $s_3 = -435.85$ |
|  |  | $s_4 = 445.46$ |
| 15 | $r_7 = 195.96$ | |
|  | $r_8 = 60.91$ | $t_3 = 8.20$ |
|  |  | $s_5 = 1.03$ |
| 16 | $r_9 = 61.51$ | |
|  | $r_{10} = 151.13$ | $t_4 = 4.57$ |

Index of refraction for all refractive elements=1.5168
Abbe numbers for all refractive elements=64.2
Back focal length=100.58 mm.
Effective focal length=1524 mm.
Total field of view=2°
Relative aperture=f/8
Stop position at vertex of first element.

Figure 2:
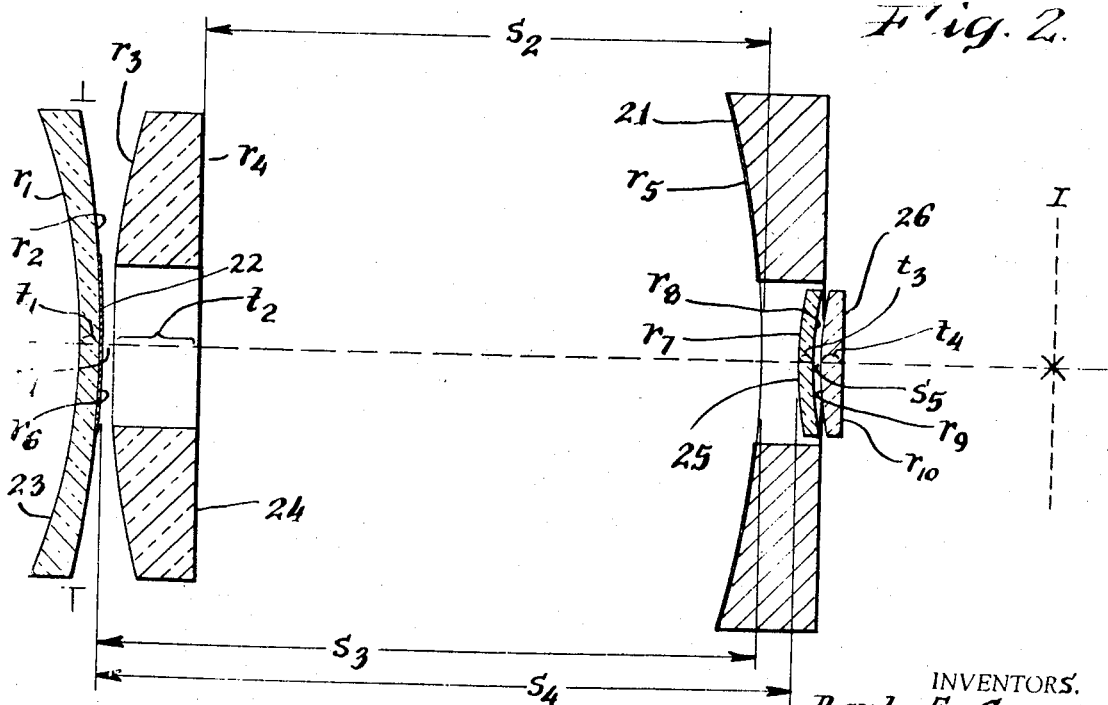
FIG. 2 is an optical diagram of another embodiment of the invention.

Referring now to FIG. 2 there is shown another embodiment of the invention.

This embodiment, as in the FIG. 1 embodiment, includes a primary mirror 21, a secondary mirror 22, a main corrector component made up of lenses 23 and 24 and auxiliary component made up of lenses 25 and 26. However, the front lens element 23 is in the form of a negative meniscus convex to the mirror 21 and the rear lens element 24 has a positive power. The numerical values of the powers of lenses 23 and 24 are approximately equal.

The following chart is a table of values of one example of a system constructed in accordance with this embodiment.

CHART II

| Element | Radius | Spacings and Thickness |
|---|---|---|
| 23 | $r_1 = -1,062.13$ | |
|  | $r_2 = -1,550.06$ | $t_1 = 31.59$ |
|  |  | $s_1 = 0.00$ |
| 24 | $r_3 = 3,507.61$ | |
|  | $r_4 = \infty$ | $t_2 = 16.02$ |
|  |  | $s_2 = 587.01$ |
| 21 | $r_5 = -1,983.84$ | |
| 22 | $r_6 = -1,550.06$ | $s_3 = -603.04$ |
|  |  | $s_4 = 616.34$ |
| 25 | $r_7 = 363.76$ | |
|  | $r_8 = 80.35$ | $t_3 = 11.45$ |
|  |  | $s_5 = 1.42$ |
| 26 | $r_9 = 81.53$ | |
|  | $r_{10} = 288.52$ | $t_4 = 3.45$ |

Index of refraction for all refractive elements=1.5168
Abbe numbers for all refractive elements=64.2
Back focal length=132 mm.
Effective focal length=2000 mm.
Total field of view=2°
Relative aperture=f/8
Stop position at vertex of first element.

It should be noted that, although not shown, the system is provided with the customary baffles or screening members for preventing the passage of undesirable light.

What is claimed is:

1. A catadioptric Cassegrain type optical system for producing an image comprising in optical and axial alignment:
    (a) a min corrector component having a spherical double convex front lens and a spherical double concave rear lens having a centrally located aperture, said front and rear lenses being approximately equal numerical power and of opposite sign;
    (b) a concave spherical primary mirror disposed behind the main corrector component and facing the main corrector component, the concave primary mirror having a centrally located aperture;
    (c) a convex spherical secondary mirror mounted on the rear surface of the front lens of the main corrector component facing the concave primary mirror; and
    (d) an auxiliary corrector component made up of a negative meniscus front lens and a positive meniscus rear lens disposed behind the convex secondary mirror, the power of both the front and rear lenses being approximately equal numerically.

2. A catadioptric Cassegrain type optical system for producing an image comprising in optical and axial alignment:
    (a) a main corrector component having a meniscus front lens concave to the front and a plano convex rear lens, said front and rear lenses being of approximately equal numerical power and of opposite sign;
    (b) a concave spherical primary mirror disposed behind the main corrector component and facing the main corrector component, the concave primary mirror having a centrally located aperture;
    (c) a convex spherical secondary mirror mounted on the rear surface of the front lens of the main corrector component facing the concave primary mirror; and
    (d) an auxiliary corrector component made up of a negative meniscus front lens and a positive meniscus rear lens disposed behind the convex secondary mirror, the power of both the front and rear lens being approximately equal numerically.

3. A catadioptric photographic objective comprising in optical and axial alignment:
    a primary mirror (11) having acentrally located aperture;

a secondary mirror (12);
a main corrector component made up of a front lens (13) and a rear lens (14), the rear lens (14) having centrally located aperture; and
an auxiliary corrector component made up of a front lens (15) and a rear lens (16), characterized by the following data

CHART I

| Element | Radius | Spacings and Thickness |
|---|---|---|
| 13 | $r_1 = 605.59$ | |
| | $r_2 = -1,146.29$ | $t_1 = 25.90$ |
| | | $s_1 = 1.00$ |
| 14 | $r_3 = -1,018.75$ | $t_2 = 11.50$ |
| | $r_4 = 634.29$ | $s_2 = 424.27$ |
| 11 | $r_5 = -1,433.83$ | $s_3 = -435.85$ |
| 12 | $r_6 = -1,146.29$ | $s_4 = 445.46$ |
| 15 | $r_7 = 195.96$ | $t_3 = 8.20$ |
| | $r_8 = 60.91$ | $s_5 = 1.03$ |
| 16 | $r_9 = 61.51$ | $t_4 = 4.57$ |
| | $r_{10} = 151.13$ | |

$r$ = radius
$s$ = spacing
$t$ = thickness
Index of refraction for all refractive elements = 1.5168
Abbe numbers for all refractive elements = 64.2
Back focal length = 100.58 mm.
Effective focal length = 1525 mm.
Total field of view = 2°
Relative aperture = $f/8$
Stop position at vertex of first element.

4. A catadioptric photographic objective comprising in optical and axial alignment:
 a primary mirror (21) having a centrally located aperture;
 a secondary mirror (22);
 a main corrector component made up of a front lens (23) and a rear lens (24), the rear lens (24) having a centrally located aperture; and
 an auxiliary corrector component made up of a front lens (25) and a rear lens (26), characterized by the following data:

CHART II

| Element | Radius | Spacings and thickness |
|---|---|---|
| 23 | $r_1 = -1,062.13$ | $t_1 = 31.59$ |
| | $r_2 = -1,550.06$ | |
| | | $s_1 = 0.00$ |
| 24 | $r_3 = 3,507.61$ | $t_2 = 16.02$ |
| | $r_4 = \infty$ | |
| 21 | $r_5 = -1,983.84$ | $s_2 = 587.01$ |
| 22 | $r_6 = -1,550.06$ | $s_3 = -603.04$ |
| | $r_7 = 363.76$ | $s_4 = 616.34$ |
| 25 | | $t_3 = 11.45$ |
| | $r_8 = 80.35$ | |
| | $r_9 = 81.53$ | $s_5 = 1.42$ |
| 26 | $r_{10} = 288.52$ | $t_4 = 3.45$ |

$r$ = radius
$s$ = spacing
$t$ = thickness
Index of refraction for all refractive elements = 1.5168
Abbe numbers for all refractive elements = 64.2
Back focal length = 132 mm.
Effective focal length = 2000 mm.
Total field of view = 2°
Relative aperture = $f/8$
Stop position at vertex of first element.

References Cited

UNITED STATES PATENTS 2,726,574  12/1955  Mandler _____ 350—199
3,119,892  1/1964  Shenker _____ 350—199

JOHN K. CORDIN, Primary Examiner

U.S. Cl. X.R.

350—212